US006490342B1

United States Patent
Dollinger

(10) Patent No.: US 6,490,342 B1
(45) Date of Patent: Dec. 3, 2002

(54) METHOD FOR QUICKLY TESTING THE OPERABILITY OF A SUBSCRIBER CIRCUIT

(75) Inventor: Rudolf Dollinger, München (DE)

(73) Assignee: Siemens Aktiengesellschaft, Munich (DE)

( * ) Notice: Subject to any disclaimer, the term of this patent is extended or adjusted under 35 U.S.C. 154(b) by 128 days.

(21) Appl. No.: 09/626,316

(22) Filed: Jul. 26, 2000

Related U.S. Application Data

(63) Continuation of application No. PCT/DE99/00065, filed on Jan. 13, 1999.

(30) Foreign Application Priority Data

Jan. 26, 1998 (DE) .......................................... 198 02 825

(51) Int. Cl.[7] .............................................. H04M 1/24
(52) U.S. Cl. ....................... 379/27.01; 379/1.04; 379/9; 379/26.01; 379/27.03; 379/29.03
(58) Field of Search ............................... 379/1.01, 1.04, 379/10.01, 22.02, 22.04, 26.01, 26.02, 9, 27.01, 15.01, 15.02, 24, 9.05, 27.03, 27.04, 29.01, 29.04, 30; 370/241, 242

(56) References Cited

U.S. PATENT DOCUMENTS

| 5,689,546 A | * | 11/1997 | Sheets et al. ................. | 379/34 |
| 5,805,668 A | * | 9/1998 | Kim ............................... | 379/9 |
| 5,940,473 A | * | 8/1999 | Lee ................................ | 379/1 |
| 6,169,785 B1 | * | 1/2001 | Okazaki ....................... | 379/27 |
| 6,181,775 B1 | * | 1/2001 | Bella ........................... | 379/29 |
| 6,269,150 B1 | * | 7/2001 | Herrbach et al. .............. | 379/1 |
| 6,272,209 B1 | * | 8/2001 | Bridger et al. ................ | 379/27 |
| 6,314,162 B1 | * | 11/2001 | Fulcomer et al. ............. | 379/24 |

FOREIGN PATENT DOCUMENTS

| EP | 0 451 759 A2 | 10/1991 |
| EP | 0 543 161 A2 | 5/1993 |

OTHER PUBLICATIONS

B. Roche: "Electronic Borscht Circuits And the Local Network", XP–002107998.

* cited by examiner

*Primary Examiner*—Rexford Barnie
(74) *Attorney, Agent, or Firm*—Laurence A. Greenberg; Werner H. Stemer; Gregory L. Mayback

(57) ABSTRACT

Test functions to test an operability of a subscriber circuit are integrated in the subscriber circuit. The test functions use existing components and do not significantly burden the signal processor of the subscriber circuit. The subscriber circuit is provided in a digital telephone exchange having connectable subscriber lines and has a high-voltage section and a low-voltage section. Once an alternating current, which is produced by a tone generator, has been fed into connecting paths, a frequency-selective current threshold-value comparison is carried out, by which the operability of the subscriber circuit can quickly be confirmed.

4 Claims, 2 Drawing Sheets

METHOD FOR QUICKLY TESTING THE OPERABILITY OF A SUBSCRIBER CIRCUIT

CROSS-REFERENCE TO RELATED APPLICATIONS

This application is a continuation of copending International Application No. PCT/DE99/00065, filed Jan. 13, 1999, which designated the United States.

BACKGROUND OF THE INVENTION

Field of the Invention

The invention relates to a quick test of the operability of a subscriber circuit of a digital telephone exchange.

A test procedure for testing the operability is already known in which the subscriber circuit is disconnected from the subscriber line through the use of at least one relay, and is connected to a central test unit.

This procedure has disadvantages since additional space-consuming and costly relays must be located on the subscriber line module, on which there may be a number of subscriber circuits. Since the operability test is carried out using a central, external test unit which occupies the space of two subscriber line modules, it furthermore means that at least 32 fewer subscribers can be connected to the telephone exchange.

In addition, the test procedure can be applied by the central test unit to individual subscriber circuits only serially.

Furthermore, Published European Patent Application EP 0 451 759 discloses how a test of the transmission characteristics of a subscriber circuit can be integrated together with the connected subscriber lines in the subscriber circuit. This principle is based on accessing various points in the reception path and in the transmission path of a signal processor contained in the subscriber circuit in order to use the voltages which occur at these points and are either caused or are fed in separately by the normal telephone operation to determine specific transmission characteristics of a subscriber circuit together with subscriber lines, by forming a paired correlation product. However, this procedure is not suitable for quickly testing the operability of a subscriber circuit, since the signal processor is severely burdened with storage and computation tasks as a result of the numerous voltage values to be evaluated and as a result of the complex calculation method for the transmission characteristics, such as the return loss or transmission level, for which reason it takes too long to determine a final result for a quick test procedure.

SUMMARY OF THE INVENTION

It is accordingly an object of the invention to provide a method for testing an operability of a subscriber circuit of a digital telephone exchange which overcomes the above-mentioned disadvantages of the heretofore-known methods of this general type and which is as quick as possible while, at the same time, the circuitry complexity and costs are kept low.

With the foregoing and other objects in view there is provided, in accordance with the invention, a method for quickly testing an operability of a subscriber circuit of a digital telephone exchange, which includes the steps of:

producing, with a tone generator provided in a subscriber circuit, an alternating voltage having a given frequency;

amplifying the alternating voltage with an amplifier provided in the subscriber circuit for supplying an amplified alternating voltage;

feeding the amplified alternating voltage into connecting paths of the subscriber circuit, the connecting paths being provided for a connection to respective lines of a subscriber line;

diverting the amplified alternating voltage to ground via respective capacitors connected to the connecting paths for the respective lines;

measuring respective alternating current levels in the connecting paths for providing respective measured alternating current levels;

forming a sum of the respective measured alternating current levels for providing a summed alternating current level;

comparing, in a frequency-selective manner, the summed alternating current level with a current threshold value; and selectively outputting a positive test result, if the summed alternating current level exceeds the current threshold value, and confirming a defect, if the summed alternating current level is below the current threshold value.

The principle on which the invention is based is, in particular, to integrate the test functions of the test procedure in the subscriber circuit using already existing components, without significantly burdening the signal processor by time-consuming storage and computation tasks.

This is achieved in that a tone generator which is located in the subscriber circuit and whose task is primarily to transmit a search-tone signal when a defect occurs, in order to make it easier for the maintenance personnel to trace the defect, produces an alternating voltage. The alternating voltage is fed, using an amplifier (contained in the subscriber circuit) for the alternating current that is produced, into the connecting paths which are used to connect the lines of a subscriber line. The alternating currents, which are caused by the alternating voltage and are diverted to ground via capacitors connected to the connecting paths in order to ensure electromagnetic compatibility, are measured. The measured alternating-current levels are then added and are compared on a frequency-selective basis with a current threshold value. A defect in the subscriber circuit is confirmed if the total alternating-current level is below the current threshold value.

Thus, using the test procedure according to the invention, it is possible to eliminate relays on the subscriber line module on which the subscriber circuit is located.

A further advantage is achieved by the procedure according to the invention in that the central external test unit becomes superfluous, and two module plug-in slots are thus available for further subscriber connections (approx. 32 subscribers).

In addition, the test procedure for operability of a subscriber circuit can be carried out in a decentralized manner, and in parallel for the individual subscriber circuits.

Also, the signal processor is not additionally burdened by the test procedure according to the invention with a time-consuming determination procedure for transmission characteristics, but is burdened only with a process of comparing current levels, so that the test procedure can be carried out quickly in the manner according to the invention.

According to a preferred mode of the invention, the test procedure is advantageously expanded by repeating the procedure specified above if the test result is negative, with the alternating voltage produced by the tone generator being at a different frequency when the test is repeated. The presence of a defect in the subscriber circuit is confirmed only if the level is once again below the current threshold value.

In accordance with another mode of the invention, the magnitude of the current threshold value is made dependent on the frequency of the alternating voltage produced by the tone generator, taking into account the frequency dependency of the impedance of the capacitors.

The test procedure according to the invention is preferably supplemented such that the test procedure is immediately terminated if a subscriber who is connected to the subscriber circuit to be tested lifts the handset of a telephone or of some other terminal. Otherwise the subscriber could hear a test tone in the telephone earpiece in addition to a dialing tone.

Other features which are considered as characteristic for the invention are set forth in the appended claims.

Although the invention is illustrated and described herein as embodied in a method for quickly testing the operability of a subscriber circuit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
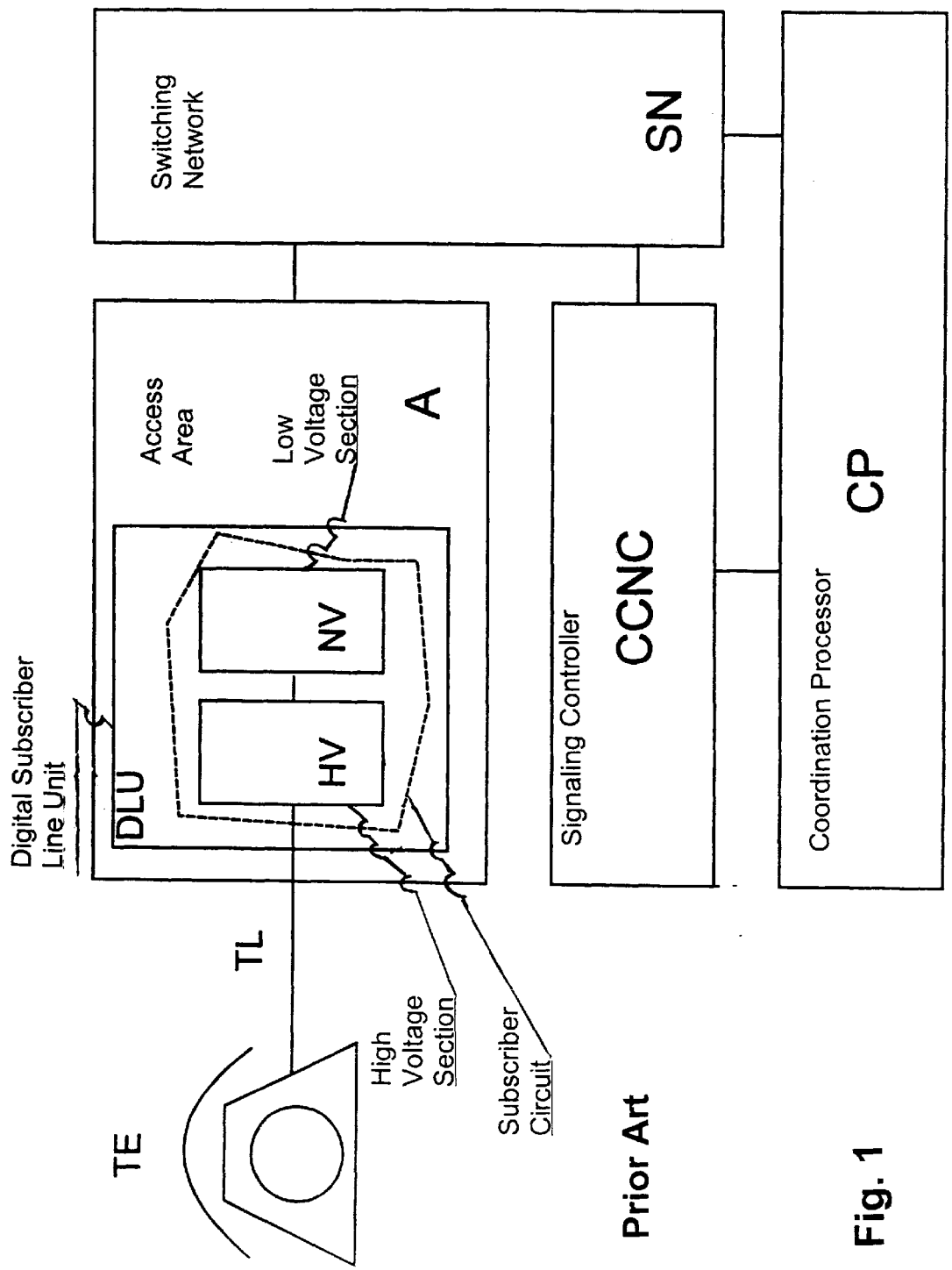
FIG. 1 is a block diagram illustrating the system architecture of a telephone exchange with a subscriber circuit as a subcomponent for which an operability test is carried out.

Referring now to the figures of the drawings in detail and first, particularly, to FIG. 1 thereof, there are shown the central components of a digital time-division multiplex telephone exchange. The components in this case are a switching network SN, a signaling controller CCNC, a coordination processor CP and the access area A. The access area A includes a number of digital subscriber line units DLU, to which subscriber terminals, which are identified symbolically by a telephone TE in FIG. 1, are connected either directly or through the use of a private branch exchange, via subscriber lines TL.

Among other items, the subscriber line unit includes a number of subscriber circuits, which form the interface between the subscriber lines and the digital environment in the telephone exchange.

FIG. 1 shows such a subscriber circuit indicated by a box drawn with a dashed line. The subscriber circuit shown here is used for connection of an analog subscriber line TL. As can also be seen in FIG. 2, such a subscriber circuit includes two central sections, a high-voltage section HV and a downstream-connected low-voltage section NV, from which there is a connection to the switching network SN via further subcomponents (which are not shown here) in the access area. In particular, such a high-voltage section contains line drivers as well as elements for subscriber line status indication. The low-voltage section is essentially used as an analog/digital interface, providing, inter alia, a two-wire/four-wire conversion, and containing a signal processor.

Figure 2:
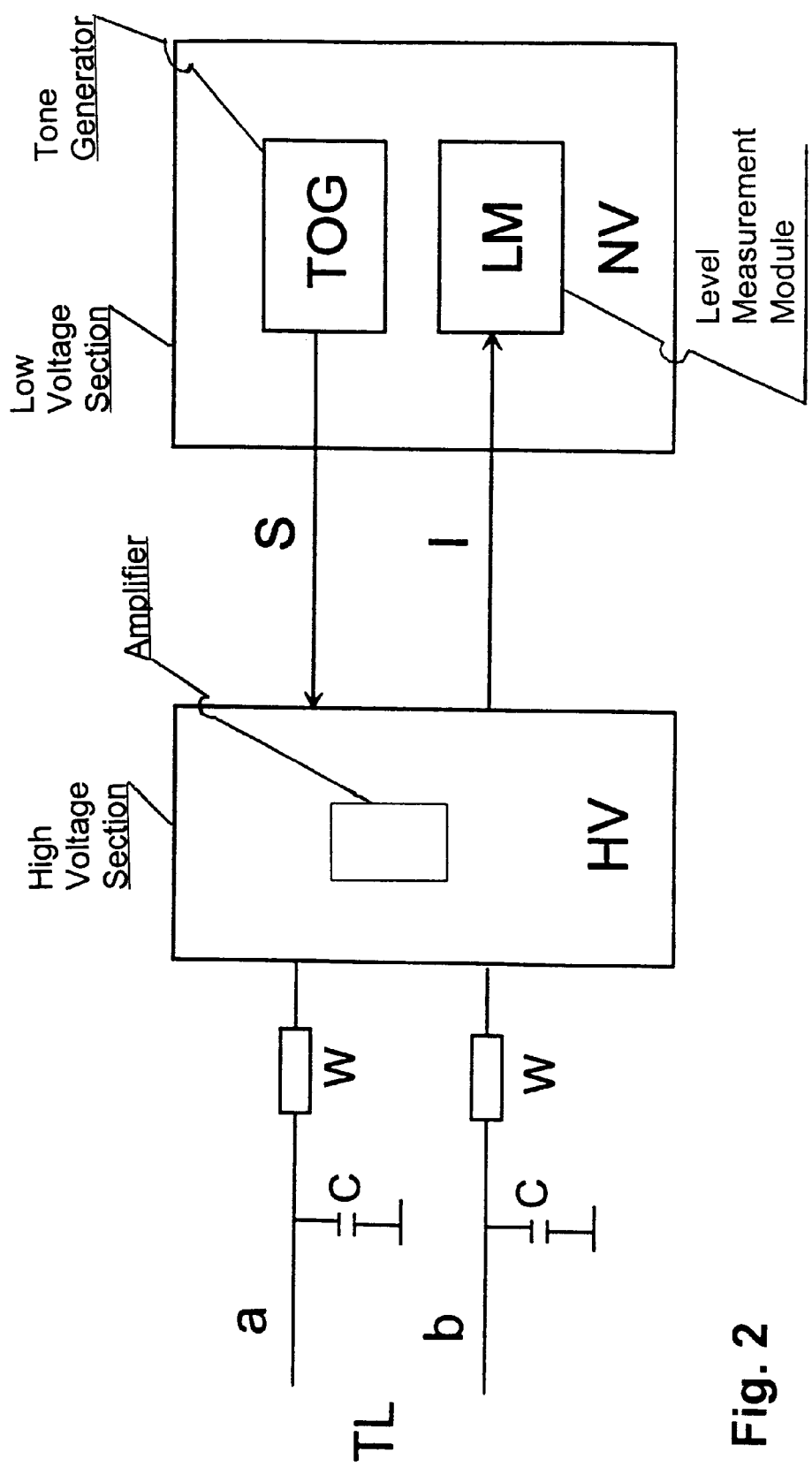
FIG. 2 is a block diagram of a subscriber circuit including components for carrying out the integrated test functions according to the invention.

FIG. 2 shows further components of the low-voltage section, a tone generator TOG and a so-called level measurement module or LM module, which is used for current level comparison. The tone generator produces an alternating voltage at a frequency of 3 kHz, for example. The alternating current S which is passed on to the high-voltage section is amplified in the high-voltage section HV through the use of an amplifier, and is fed into the connecting paths connected to the lines a and b of the subscriber line TL. The alternating currents in the connecting paths flow via in each case one resistor W and a capacitor C to ground, the capacitor being connected to the connecting path in order to ensure electromagnetic compatibility. The alternating currents are measured in the high-voltage section. The alternating-current levels are added, and are then multiplied by a scaling factor, whose magnitude depends on the amplifier which is used. The summed alternating-current level I is then passed on in the form of a sum signal to the low-voltage section, in whose LM module the summed alternating-current level is compared on a frequency-selective basis with a current threshold value. If the summed current level is greater than the current threshold value, the LM module outputs the result "subscriber circuit operable." If the summed alternating-current level is less than the magnitude of the current threshold value, the LM module produces the result "subscriber circuit not operable."

In particular, the following functions of the subscriber circuit can be verified using the integrated test procedure according to the invention:

The operability of the tone generator, in that it produces an alternating voltage, and of the amplifier in the high-voltage section, which amplifies the alternating current.

The presence and the operability of the capacitors which are connected to the connecting paths for the lines of the subscriber line in order to ensure electromagnetic compatibility.

The operability of the current measuring devices, which are used to measure the subscriber line currents during telephone operation.

The test procedure according to the invention may be expanded by repeating the procedure for a result confirmation, if the result of a first test run is negative. During the repeat run, the tone generator now produces an alternating voltage at a frequency which is different from the alternating voltage in the first run (for example 600 Hz). The magnitude of the current threshold value is adapted depending on the chosen frequency of the alternating voltage which is produced, thus taking account of the frequency dependency of the impedance of the capacitors.

As a supplement to the exemplary embodiment described above, the test procedure according to the invention is terminated immediately if a subscriber who is connected to the subscriber circuit to be tested lifts the handset of his/her telephone or of some other terminal in order to make a call. This prevents the subscriber from hearing the test tone in the earpiece.

I claim:

1. A method for quickly testing an operability of a subscriber circuit of a digital telephone exchange, the method which comprises:

producing, with a tone generator provided in a subscriber circuit, an alternating voltage having a given frequency;

amplifying the alternating voltage with an amplifier provided in the subscriber circuit for supplying an amplified alternating voltage;

feeding the amplified alternating voltage into connecting paths of the subscriber circuit, the connecting paths being provided for a connection to respective lines of a subscriber line;

diverting the amplified alternating voltage to ground via respective capacitors connected to the connecting paths for the respective lines;

measuring respective alternating current levels in the connecting paths for providing respective measured alternating current levels;

forming a sum of the respective measured alternating current levels for providing a summed alternating current level;

comparing, in a frequency-selective manner, the summed alternating current level with a current threshold value; and selectively outputting a positive test result, if the summed alternating current level exceeds the current threshold value, and confirming a defect, if the summed alternating current level is below the current threshold value.

2. The method according to claim 1, which comprises:

if the summed alternating current level is below the current threshold value in the comparing step, producing, with the tone generator, an alternating voltage having a further given frequency different from the given frequency, and repeating the steps of amplifying, feeding, diverting, measuring, forming the sum, and comparing; and confirming a detection of the defect in the subscriber circuit only if the summed alternating current level is again below the current threshold value.

3. The method according to claim 2, which comprises providing a magnitude of the current threshold value as a function of the given frequency and the further given frequency of the alternating voltage produced by the tone generator.

4. The method according to claim 1, which comprises terminating a testing of an operability of the subscriber circuit immediately, if a loop closure caused by a subscriber is identified during the testing.

* * * * *